Hunt & Sands,
Mortar Mixer.
N° 14,613.   Patented Apr. 8, 1856.

UNITED STATES PATENT OFFICE.

HENRY W. HUNT, OF PEEKSKILL, NEW YORK, AND JOHN SANDS, OF GREENWICH, CONNECTICUT.

MACHINE FOR MIXING LIME AND SAND FOR MORTAR.

Specification of Letters Patent No. 14,613, dated April 8, 1856.

*To all whom it may concern:*

Be it known that we, HENRY W. HUNT, of Peekskill, in the county of Westchester and State of New York, and JOHN SANDS, of Greenwich, in the county of Fairfield and State of Connecticut, have invented a new and useful Machine for Mixing Lime and Sand for Mortar; and we do hereby declare that the following is a full, clear, and exact description of the same, reference being had to the annexed drawings, making a part of this specification, in which—

Figure 1:
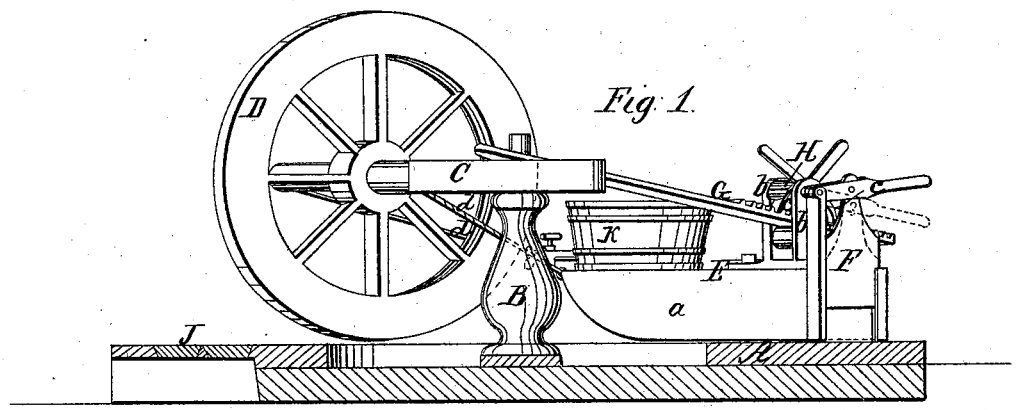
Figure 2:
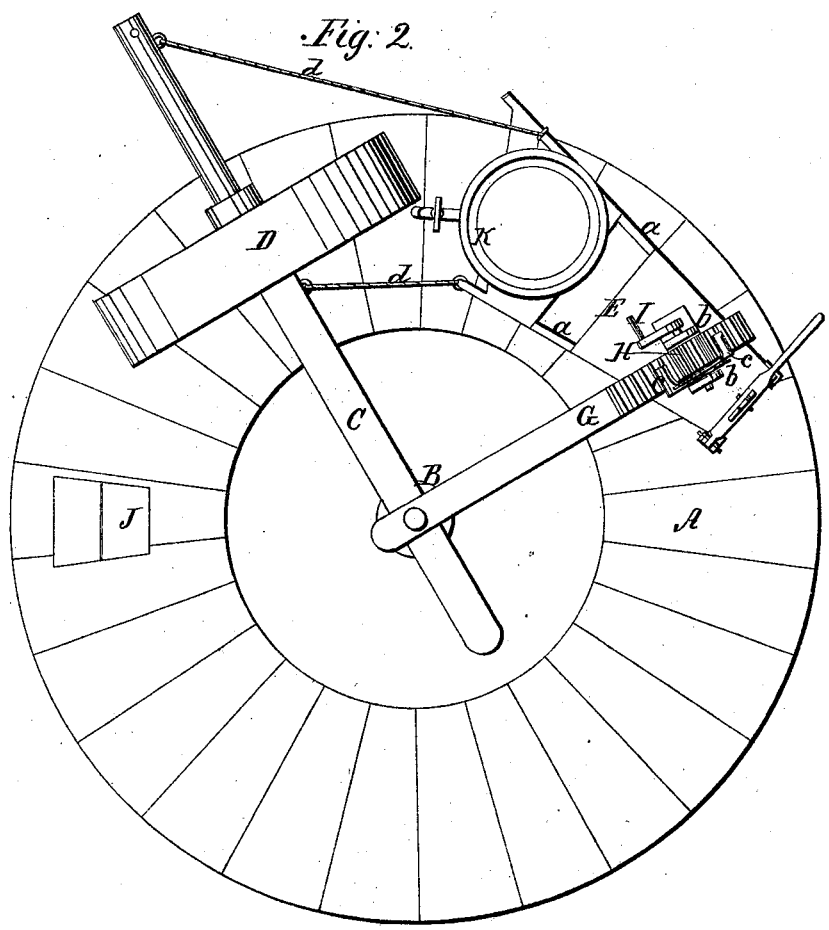

Figure 1, is a side view of our improvement the annular bed being bisected through its center. Fig. 2, is a plan or top view of ditto.

Our invention consists in the employment or use of an annular bed, wheel, and drag, arranged as will be presently shown and described, whereby lime and sand may be mixed in an expeditious manner for mortar.

To enable those skilled in the art to fully understand and construct our invention we will proceed to describe it.

A, represents an annular bed which may be constructed of wood, or cast iron. The bed may be of any suitable width and may be formed with a greater or less radius.

B, is a vertical post placed at the center from which the bed is struck or formed, and C, is a horizontal shaft, the inner end of which is allowed to turn freely on the upper end of the post.

D, is a wheel which is placed loosely on the shaft C, the wheel working on the bed A, and being of a suitable width.

E, represents a drag, which is formed of two side pieces (a), having their front ends rounded similar to sled runners. The side pieces (a), are placed angularly with each other as shown clearly in Fig. 2; so that the space between their front ends is wider than the space between their back ends. A door or gate F, is placed at the back end of the drag.

G, represents a rack bar, one end of which is fitted on the upper end of the post B. The opposite end is fitted between two uprights (b), (b), on the drag E, and has a pinion H, gearing into it. The axis of the pinion H, has a crank I, at one end, and two pawls (c), (c), are attached to one of the uprights (b), said pawls preventing the drag from moving laterally on the bed A.

J, represents a trap door in the bed A.

K, represents a water reservoir placed on the front part of the drag E. The front end of the drag E, is attached by ropes or chains (d) to the shaft C.

Operation: A horse is attached to the outer end of the shaft C, and the lime, previously slaked in a tub or vessel adjoining the bed, is spread upon the bed A, and a proper quantity of sand is spread over the lime. The shaft C, is then drawn around by the horse, the wheel D, spreading out the lime, and sand upon the bed and the drag E, gathering or drawing it in a narrow ridge, the door or gate F, being raised so that the lime and sand can pass through the back end of the drag see red coloring in Fig. 2. Thus the wheel spreading out the lime and sand upon the bed and the drag drawing it in toward the center causes the lime and sand to be well mixed after a few revolutions of the wheel. Water is permitted to flow gradually by means of a faucet from the reservoir K, upon the lime and sand so that it may be properly tempered while being worked or mixed. When the lime and sand is thoroughly mixed the door or gate F, at the back end of the drag is closed, and the trap door J, is opened. And the drag will discharge the mortar through the trap door J, the mortar falling into a receptacle prepared to receive it. The drag E, may be adjusted laterally upon the bed A, when desirable by turning the pinion H, the pawls (b), (b), being raised free from the rack bar. Other devices however may be employed for this purpose.

Having thus described our invention what we claim as new and desire to secure by Letters Patent is,

The combination of the annular bed A, wheel D, attached to the rotating shaft C, and drag E, the above parts being constructed and arranged substantially as shown for the purpose specified.

HENRY W. HUNT.
JOHN SANDS.

Witnesses:
S. H. WALES,
WM. TUSCHE.